(12) United States Patent
Bultez

(10) Patent No.: US 9,132,522 B2
(45) Date of Patent: Sep. 15, 2015

(54) PROCESS FOR SURFACING A SURFACE OF A SPECTACLE LENS

(75) Inventor: Xavier Bultez, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 0 days.

(21) Appl. No.: 14/239,310

(22) PCT Filed: Aug. 22, 2012

(86) PCT No.: PCT/FR2012/051921
§ 371 (c)(1),
(2), (4) Date: Feb. 18, 2014

(87) PCT Pub. No.: WO2013/030495
PCT Pub. Date: Mar. 7, 2013

(65) Prior Publication Data
US 2014/0199918 A1   Jul. 17, 2014

(30) Foreign Application Priority Data
Sep. 1, 2011 (FR) ...................................... 11 57751

(51) Int. Cl.
*B24B 13/06* (2006.01)
*G05B 19/4093* (2006.01)

(52) U.S. Cl.
CPC .......... *B24B 13/06* (2013.01); *G05B 19/40937* (2013.01); *G05B 2219/45175* (2013.01)

(58) Field of Classification Search
CPC ...... B24B 7/24; B24B 7/242; B24B 13/0018; B24B 13/0016; B24B 13/0012; B24B 13/06; B24B 13/01; B24B 51/00; B23C 2200/203; B23C 2226/315; B23C 2226/61; G02B 3/14; G02B 5/1876; G05B 2219/45175; G05B 19/40937; G05B 19/416

USPC ........ 451/5, 8–10, 42, 63; 700/174, 176, 177; 82/1.11, 118, 11.3, 124; 351/159, 74, 351/159.8

See application file for complete search history.

(56) References Cited

U.S. PATENT DOCUMENTS 4,854,089 A * 8/1989 Morales .......................... 451/42
5,537,523 A * 7/1996 Harashima et al. ........... 345/440

(Continued)

FOREIGN PATENT DOCUMENTS

| DE | 10 2007 040395 A1 | 3/2009 |
| EP | 0 937 542 A1 | 8/1999 |
| WO | 2011/083234 A1 | 7/2011 |

OTHER PUBLICATIONS

International Search Report, dated Oct. 12, 2012, from corresponding PCT application.

*Primary Examiner* — George Nguyen
(74) *Attorney, Agent, or Firm* — Young & Thompson

(57) ABSTRACT

A method of surfacing a surface of a spectacle lens, includes a step of determining a fixed rotation speed (Vrot) of the lens based on geometric characteristics of the surface, wherein the step of determining the rotation speed (Vrot) includes the following steps: generating (102), based on the geometric characteristics of the surface (12), a file of geometric altitude values of the surface, the file being centered on a zero geometric altitude value at a predetermined reference point; determining (103) a value representative of the greatest difference (MaxHk) in geometric altitude values on the surface; deducing (107) the rotation speed (Vrot) from the value of the greatest difference (MaxHk) in geometric altitude values on the surface and from a geometric value of the cylinder at a predetermined far-vision control point.

16 Claims, 6 Drawing Sheets

(56) References Cited

U.S. PATENT DOCUMENTS

| | | | |
|---|---|---|---|
| 6,012,965 A * | 1/2000 | Savoie | 451/6 |
| 6,322,946 B1 * | 11/2001 | Mahabadi et al. | 430/137.12 |
| 6,623,339 B1 * | 9/2003 | Igarashi et al. | 451/42 |
| 6,789,898 B2 * | 9/2004 | Le Saux et al. | 351/159.01 |
| 6,991,525 B2 * | 1/2006 | Diehl et al. | 451/65 |
| 7,004,821 B2 * | 2/2006 | Guillermin et al. | 451/43 |
| 7,731,565 B2 * | 6/2010 | Shibata et al. | 451/5 |
| 7,766,723 B2 * | 8/2010 | Mazoyer | 451/5 |
| 7,846,009 B2 * | 12/2010 | Mazoyer | 451/8 |
| 7,954,253 B2 * | 6/2011 | Dall'Aglio et al. | 33/555.1 |
| 8,523,353 B2 * | 9/2013 | Biton et al. | 351/159.74 |
| 8,678,586 B2 * | 3/2014 | Mandler | 351/159.74 |
| 2002/0086613 A1 * | 7/2002 | Hatano | 451/5 |
| 2002/0160690 A1 * | 10/2002 | Miyazawa et al. | 451/5 |
| 2006/0260447 A1 * | 11/2006 | Savoie et al. | 82/1.11 |
| 2006/0260448 A1 * | 11/2006 | Fiedler et al. | 82/1.11 |
| 2007/0277357 A1 * | 12/2007 | Meyer et al. | 29/27 C |
| 2008/0192200 A1 * | 8/2008 | Iribarne | 351/177 |
| 2010/0042079 A1 * | 2/2010 | Frey et al. | 606/4 |
| 2010/0311310 A1 * | 12/2010 | Takeichi | 451/5 |
| 2011/0065361 A1 * | 3/2011 | Schussler et al. | 451/11 |
| 2011/0157547 A1 * | 6/2011 | Dillon et al. | 351/177 |
| 2012/0205847 A1 * | 8/2012 | Pavel et al. | 269/13 |
| 2012/0240736 A1 | 9/2012 | Martin et al. | |
| 2014/0199918 A1 * | 7/2014 | Bultez | 451/5 |

* cited by examiner

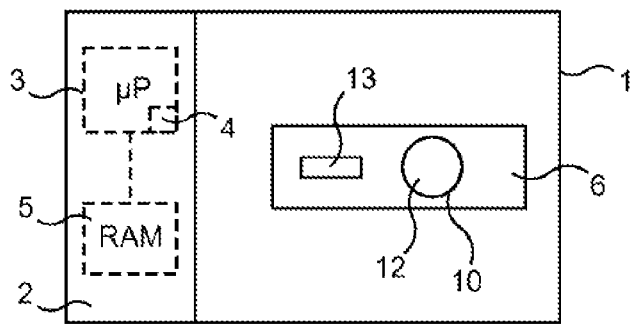
Fig. 1
Fig. 2
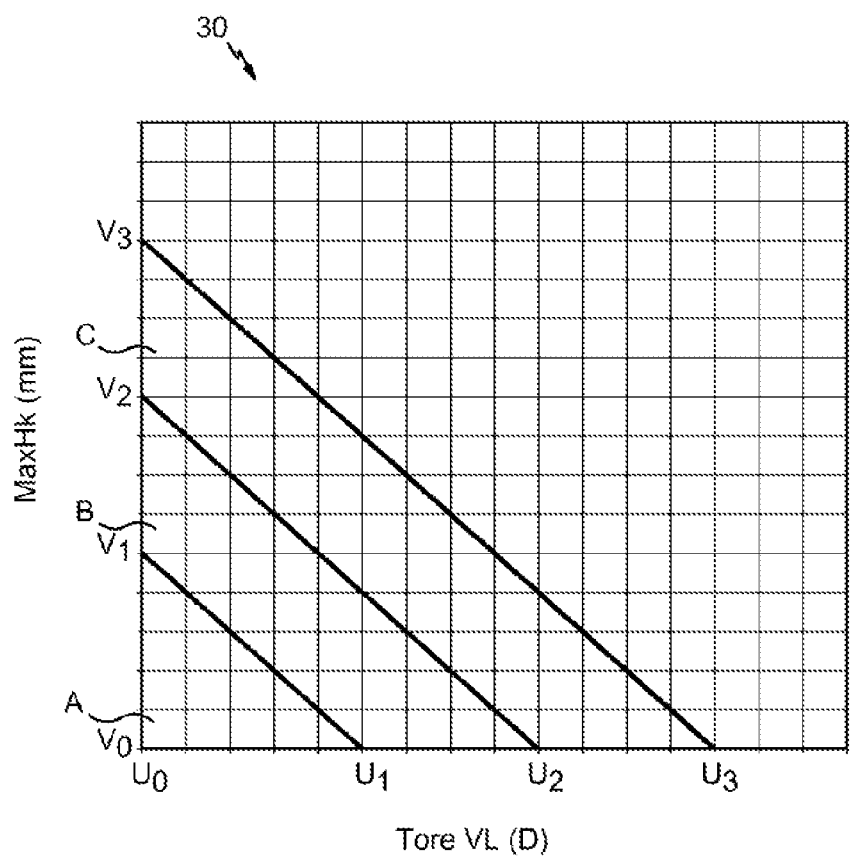

Fig. 5

PROCESS FOR SURFACING A SURFACE OF A SPECTACLE LENS

BACKGROUND OF THE INVENTION

1. Field of the Invention

The invention relates to a process for surfacing, in particular polishing, a surface of a spectacle lens.

The invention also relates to a control-command unit, provided with a data-processing system for executing a computer program, implementing such a surfacing process, and to a surfacing machine comprising this control-command unit.

The invention also relates to a client-server communication interface for transferring a computer program implementing such a surfacing process to a remote computer and its execution on this computer, or for transferring input and output data.

Generally, the time taken to surface a surface of a spectacle lens depends on the machine used and on the material from which the surface is made.

The expression "surfacing" is understood to mean both turning machining operations, such as rough turning and/or finishing, and polishing operations.

When it is a question of polishing, the polishing time furthermore depends on the number of scans of the scanning tool over the surface of the spectacle lens, on the scanning speed and on the scanning amplitude. These parameters have an influence on the desired optical quality and the desired surface state (roughness).

The surfacing speed is not without effect on the conformity of the surface produced to the surface sought. Thus, a very low speed may ensure the conformity of a very complex surface, however it will affect the productivity thereof. In contrast, a high speed allows productivity to be increased but may affect conformity.

Furthermore, the optical function of a spectacle lens is mainly a result of two dioptres corresponding to the front and back surfaces of the spectacle lens. The topography of the surface to be produced depends on the distribution of the applied function between the front surface and the back surface of said lens. In certain cases, this distribution is such that the surface to be produced is particularly complex.

Generally, trials are carried out for complex surfaces in order to determine an optimal surfacing speed, thereby decreasing productivity.

2. Description of the Related Art

A process for machining a surface of a spectacle lens by turning is known from international patent application WO 2011/083234, in which process the rotation speed is fixed and deduced from a value representing the largest difference between mean sphere geometric values on the preset surface, and from a cylinder geometric value at a pre-determined far-vision control point.

BRIEF SUMMARY OF THE INVENTION

The invention aims to provide a surfacing process allowing even more complex surfaces, for example having a prismatic component, to be taken into account, this process being simple, easy and economical to implement.

Thus, one object of the invention, in a first aspect, is a process for surfacing a surface of a spectacle lens, comprising a step of determining a fixed rotation speed of said spectacle lens from geometric characteristics of said surface, characterized in that the step of determining the rotation speed comprises the following steps:

generating, from geometric characteristics of said surface, a file of altitude geometric values of said surface, which file is centered on a zero altitude geometric value at a preset reference point;

determining a value representing the largest difference between altitude geometric values on said surface; and deducing the rotation speed from said value of the largest difference between altitude geometric values on said surface, and from a cylinder geometric value at a predetermined far-vision control point.

The process according to the invention makes it possible to determine, simply, adequate surfacing parameters enabling both a good productivity and a good conformity of the surface produced to the surface sought, independently of the complexity of the topography, which for example has cumulate toroidal and prismatic components.

The rotation speed of the lens, i.e. the determined speed, is a fixed speed in that sense that only one speed is determined. This speed is in fact a maximum speed threshold for implementation of the surfacing process. During the implementation of the process for surfacing the lens, the surfacing machine may work with a lens turning at this threshold speed throughout the surfacing cycle.

It will be noted that in the present document the expression "altitude geometric value" $H_k$ at a point on a surface is deduced from a surface file centered on an altitude point $Z_0$ representing the intersection between the axis of rotation of the spindle bearing the lens and the reference point of the surface.

In contrast to the process described in international patent application WO 2011/083234, which only takes into account the surface coordinates (x and y coordinates) of the lens, the process according to the invention takes into account altitude differences (z coordinates) that correspond to accelerations of another spindle bearing the surfacing tool, with respect to the surface of the lens.

It will be noted that complex lens surfaces, called "free-form surfaces" or "digital surfacing" in English, and especially surfaces combining a torus and a progression, generally comprise large altitude variations that are particularly characteristic of how difficult they will be to surface.

Furthermore, in contrast to the process described above, which does not take into consideration the relative position of the surfacing tool with respect to the surface of the lens, taking altitudes into account according to the invention allows any decentering and/or rotation of the surface of the lens to be avoided since the altitude geometric values are referenced to the file of coordinates that is itself centered on an altitude point $Z_0$ representing the intersection between the axis of rotation of the spindle bearing the lens and the reference point on the surface, the axis if required passing through the prism reference point.

As regards the expression "cylinder geometric value" Cyl, it is given by the following relationship:

$$Cyl = l \times \left| \frac{1}{R1} - \frac{1}{R2} \right|;$$

where:
I is a constant;
R1 is the maximum radius of curvature of this surface at this point; and
R2 is the minimum radius of curvature of this surface at this point.

It will be noted that in the case where the constant I=n−1, where n is the refractive index of the material of the spectacle lens, the value Cyl corresponds to the optical definition of the cylinder at a point on a surface.

Here, insofar as it is the surfacing of the surface, and therefore its topography, that is of interest, independently of the optical effect resulting from the value of the refractive index, the cylinder geometric value provides a value that, while being related to the optical properties of the surface, is independent of the material of the spectacle lens, and therefore of the refractive index of the lens that will actually be manufactured.

Specifically, in the process according to the invention the rotation speed of the lens is determined independently of the material from which the lens is made.

For the sake of simplicity, it is possible to choose, for the constant I, the value 0.53. The cylinder geometric value thus obtained corresponds to the value for a spectacle lens having a refractive index n of 1.53, which is a common value in the art.

The process according to the invention allows the rotation speed of the lens to be determined in a particularly simple and easy way from values that it is possible to obtain using standard optical calculation tools, these calculation tools allowing, from a file defining the surface with a finite number of points (the number of points varying depending on the machine file), the coordinates of each point being given, for example in a Cartesian coordinate system, the altitude and the cylinder value to be calculated. These calculation tools may therefore, by arbitrarily fixing a refractive index value, for example to the aforementioned value 1.53, be used directly in the process according to the invention.

It will be noted that the largest difference between altitude geometric values is a measurement representing the largest altitude gradient on the surface to be produced and that it is therefore a value that is perfectly representative of how difficult a surface will be to produce.

Taking into account the cylinder geometric value at the far-vision control point makes it possible to take into account the toroidal component (if there is one), which is another source of difficulty in surfacing.

Thus, the process according to the invention allows, via relatively simple calculations, the maximum threshold rotation speed of the lens to be determined.

Of course, the rules for deducing the rotation speed of the lens from the value of the largest difference between altitude geometric values and from the cylinder geometric value at the far-vision control point is based on a calibration that is easy to carry out using a reasonable number of trials.

This calibration may furthermore be expressed in the form of a relatively simple look-up table, as will be explained below.

According to preferred, simple, easy and economical features of the process according to the invention, the step of determining the value representing the largest difference between altitude geometric values comprises a step of processing the altitude geometric values of said surface in said centered file by taking into account pairs of individual points on said surface, which individual points of each pair are diagonally opposite on said surface, the diagonal passing through said preset reference point, said individual points being equidistant from said preset reference point.

Taking into account pairs of individual points that are diagonally opposite on the surface, the diagonal passing through the preset reference point, and equidistant from this point allows altitude gradients generated by the surface to be characterized independently of the toroidal component. Furthermore, taking such pairs of individual points into account allows the surface of the lens to be sampled in a particularly simple and easy way.

According to other preferred, simple, easy and economical features of the process according to the invention:

the step of determining the value representing the largest difference between altitude geometric values comprises a step of processing the altitude geometric values of said surface in said centered file, only a useful portion of the surface of the lens being taken into account, it being known that said useful portion contains the largest altitude gradient;

the useful portion of the surface is located in an intermediate annular zone between the periphery and center of the surface;

the useful portion of the surface has an external outline that follows a frame outline of said lens, which frame outline corresponds to the outline of said lens obtained after a trimming operation;

said preset reference point is representative of the prism reference point;

the step of determining the value of the largest difference between altitude geometric values on said surface comprises the following steps: determining first altitude geometric values on said surface; determining second altitude geometric values having a preset angular offset with respect to said first altitude geometric values; comparing said first altitude geometric values with said angularly offset second altitude geometric values; and determining the value of the largest difference between altitude geometric values on said surface;

it is a process for polishing said surface of said spectacle lens;

the process comprises at least one of the following additional steps: deducing a scan speed of the polishing machine from said value of the largest difference between altitude geometric values on said surface, from said cylinder geometric value and from the material of said spectacle lens; deducing a number of scans of the scanning tool of the polishing machine from said value of the largest difference between altitude geometric values on said surface, from said cylinder geometric value and from the material of said spectacle lens; and deducing a scanning amplitude for the scanning tool of the polishing machine from said value of the largest difference between altitude geometric values on said surface, from said cylinder geometric value and from the material of said spectacle lens;

the step of determining the rotation speed of the lens comprises the following steps: deducing a difficulty level intrinsic to said surface from the value of the largest difference between altitude geometric values and from the cylinder geometric value; and selecting the rotation speed of the lens based on said difficulty level and on parameters specific to the surfacing machine used; and/or said difficulty level intrinsic to the surface is chosen from a plurality of intrinsic difficulty levels preset as a function of preset ranges of cylinder geometric values and of preset ranges of values of the largest difference between altitude geometric values.

Another object of the invention, in a second aspect, is a control-command unit provided with a microprocessor configured to execute a computer program for implementing the process described above.

Yet another object of the invention, in a third aspect, is a surfacing machine for producing a surface of a spectacle lens comprising the command/control unit described above.

Lastly, a fourth aspect of the subject of the invention is a client-server communication interface comprising means suitable for transferring the rotation speed of the lens, which speed is determined by a computer program, in order to implement the process such as described above, when this computer program is executed in a control-command unit.

BRIEF DESCRIPTION OF THE DRAWINGS

Explanation of the invention will now continue with the description of an embodiment, given by way of illustration and nonlimiting example and with reference to the appended drawings in which:

FIG. 1 schematically shows a free-form polishing machine implementing a process for polishing a surface of a spectacle lens;

FIG. 2 illustrates a lookup table, taking the form of a graph, of preset levels of polishing difficulty;

FIG. 5 shows, in a 2-2 matrix, the altitude geometric values on the surface of the lens and the samples visible in FIG. 4;

DETAILED DESCRIPTION OF THE PREFERRED EMBODIMENTS

Figure 3:
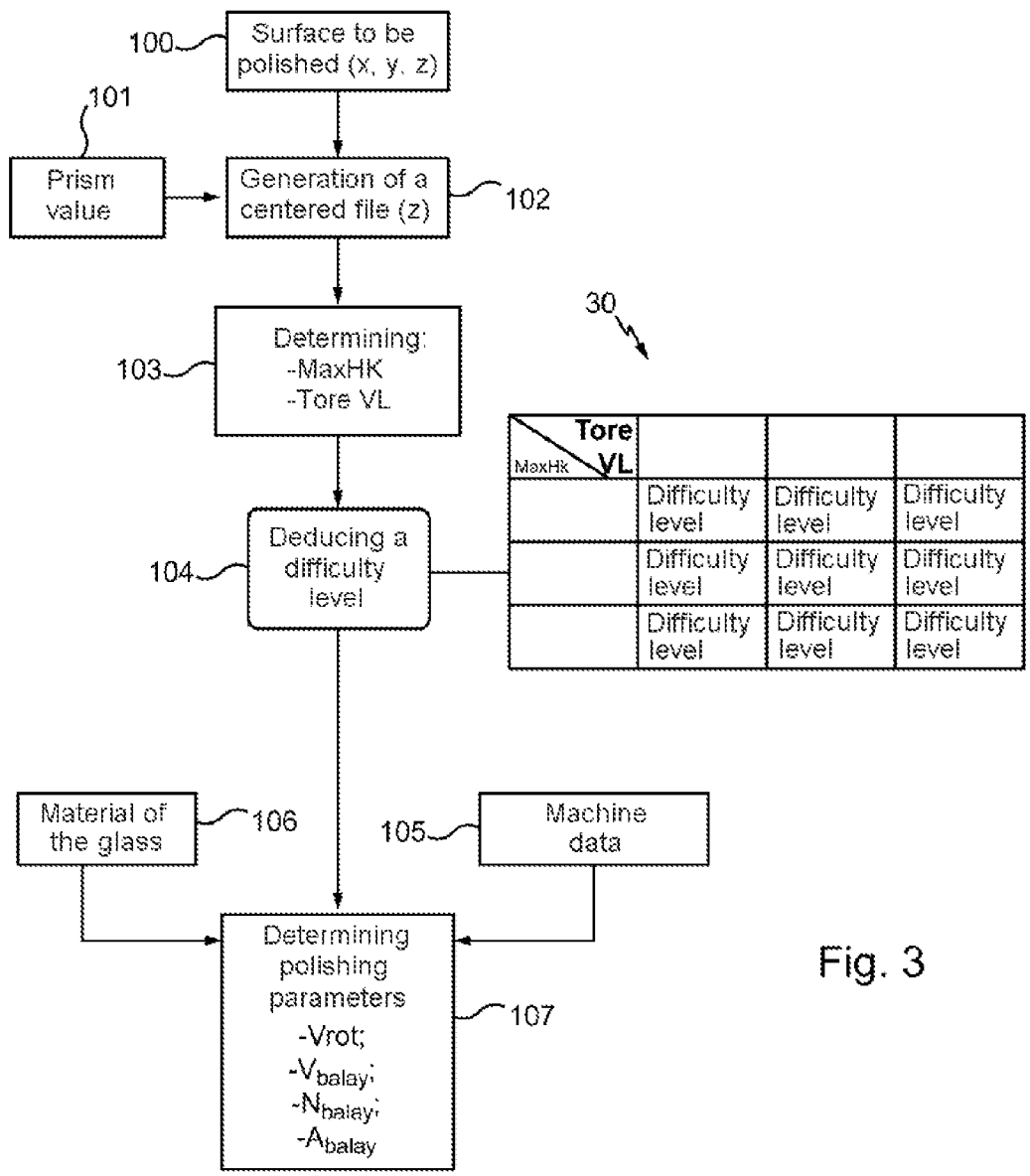
FIG. 3 is a block diagram illustrating various operating steps of the process.

FIG. 1 illustrates a digitally controlled free-form polishing machine 1, the expression "digitally controlled" designating all of the hardware and software acting to provide movement instructions to all the components of the polishing machine 1.

This machine 1 is adapted to polish a surface 12 of a spectacle lens 10, including a surface of a progressive lens, furthermore possessing toroidal and prismatic components.

For this purpose, the machine 1 comprises a spindle 13 bearing a polishing tool, said polishing tool (not shown), and a control-command unit 2 provided with a data-processing system comprising a microprocessor 3 equipped with a memory 4, especially a nonvolatile memory, allowing it to load and store a software package, also called a computer program, that, when it is executed in the microprocessor 3, allows a polishing process to be implemented.

This nonvolatile memory 4 is for example a ROM (read-only memory).

Furthermore, the unit 2 comprises a memory 5, especially a volatile memory, allowing data to be stored during the execution of the software package and the implementation of the process.

This volatile memory 5 is for example a RAM or EEPROM (for "random access memory" and "electrically erasable programmable read-only memory", respectively).

In addition, the machine 1 comprises a glazed aperture 6 adapted to allow the surface 12 of the lens 10 on which the machine 1 acts to be seen, which lens 10 is borne by another spindle (not shown).

This glazed aperture 6 allows, during implementation of the process, a user of this machine 1 to monitor the process by viewing the lens 10 in the machine 1.

In order to polish the lens 10 certain polishing parameters, such as the rotation speed Vrot of the lens, the scanning speed Vbalay, the number Nbalay of scans, and the scan amplitude Abalay of the scanning tool, need to be known with precision.

These parameters Vrot, Vbalay, Nbalay and Abalay are setpoints fed to the machine 1.

For this purpose, the process according to the invention comprises a step of determining each of these parameters.

The steps of determining the rotation speed Vrot of the lens, the scan speed Vbalay, the number Nbalay of scans and the scan amplitude Abalay will now be described with reference to FIGS. 2 to 7.

FIG. 3 is a block diagram of steps allowing the above parameters Vrot, Vbalay, Nbalay and Abalay to be determined.

The control-command unit 2 is configured to receive, in step 100, a file containing geometric characteristics of the surface 12, for example in the form of x, y, z coordinates in a Cartesian coordinate system, representing said surface 12 at a finite number of points on the latter.

Figure 4:
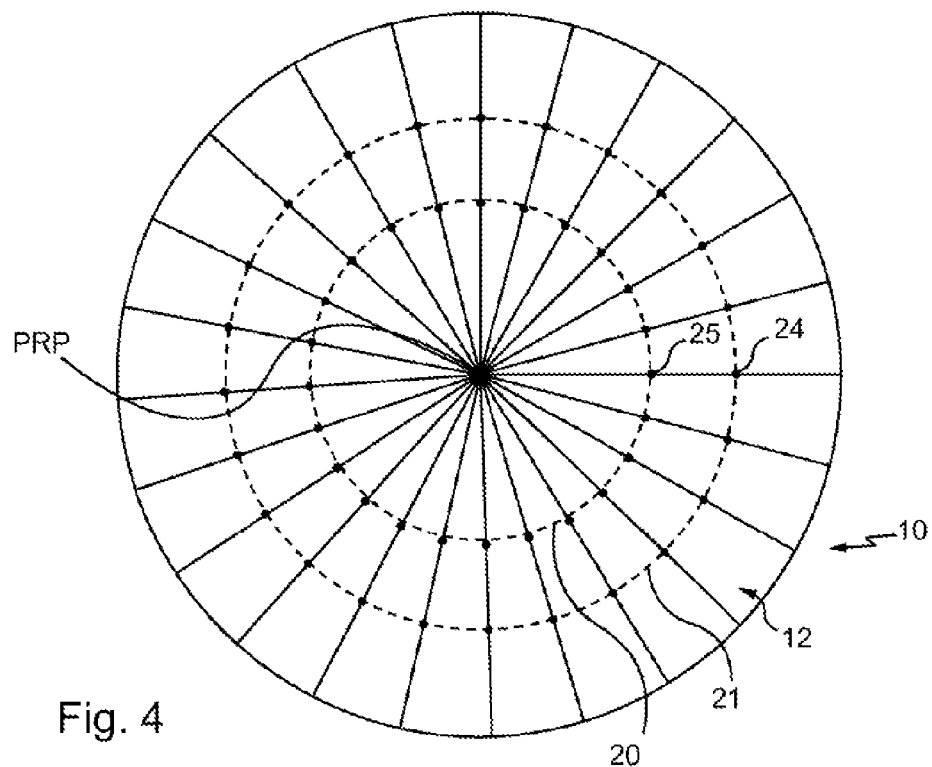
FIG. 4 schematically illustrates the surface of a spectacle lens sampled in a step of the process.

Furthermore, the control-command unit 2 is configured to receive, in step 101, a prism value (in prismatic dioptres or in degrees), then to process the surface file and generate, in step 102, from the latter, and from said prism value, a centered file of altitude (z) geometric values on the surface 12, in the form of a 2-2 (x,y) matrix, taking for the matrix reference (x=0, y=0, z=0) the point of intersection between the axis of rotation of the spindle 13 of the machine 1 and the surface 12, the axis passing through the prism reference point PRP (shown in FIG. 4).

The prism reference point PRP is the location on the lens where the prescribed prism and/or the prism-thinning (also called equi-thinning) must be specified.

The prism value may already be integrated into the (x, y, z) surface file, and, if necessary, the value received in step 101 may be zero, the unit 2 then taking this file into account to generate the centered file.

It will be noted that the prism taken into consideration may be either a prism-thinning or a prescribed prism or a combination of both.

Next, the unit 2 characterizes the surface 12, in order to determine, in step 103, a value, called MaxHk, representing the largest difference between altitude geometric values Zj on said surface 12, by sampling this surface 12.

In the illustrated example, the geometric altitude Zj at a point on the surface 12 is expressed in millimeters and is deduced from the matrix file of altitude geometric values.

It will be seen below, with reference to FIGS. 4 and 5, how the value MaxHk is determined.

Furthermore, in step 103, the unit 2 determines a cylinder geometric value, called FV Torus of the surface 12 at a far-vision control point on this surface 12.

The geometric cylinder Cyl at a point on the surface 12 is expressed in dioptres and is calculated using the following relationship:

$$Cyl = (n-1) \times \left| \frac{1}{R1} - \frac{1}{R2} \right|;$$

where:

n is a constant equal to 1.53;

R1 is the maximum radius of curvature of the surface 12 at the given point; and R2 is the minimum radius of curvature of the surface 12 at the given point.

The maximum and minimum radii of curvature, R1 and R2, respectively, are calculated in a known way from the x, y, z coordinates received in step 100, in the Cartesian coordinates system, at any point on the surface 12.

Next, the unit 2 deduces, in step 104, a level of intrinsic difficulty at the surface 12, from the value MaxHk of the largest difference between altitude geometric values Zj on the surface 12, and from the cylinder geometric value FV Torus of said surface 12.

This level of intrinsic difficulty at the surface 12 is selected from a lookup table 30, shown in the form of a graph in FIG. 2, and in the form of a matrix in FIG. 3, that is constructed beforehand and stored in the unit 2.

This lookup table 30 contains a plurality of values for the levels of intrinsic difficulty, each level being associated with various preset ranges of values, v0 to v3 for MaxHk and u0 to u3 for FV Torus.

The values $v_0$ to $v_3$ of MaxHk and $u_0$ to $u_3$ of Tore VL are expressed in millimeters and dioptres, respectively, and correspond to the ordinate and abscissa of said lookup table 30, respectively.

Three levels of difficulty (i.e., difficulty levels), referenced A to C, respectively, representing increasing levels of difficulty, are shown.

The lookup table 30 contains thresholds between the difficulty levels A to C, which thresholds are represented by straight lines of negative slope, each of these straight lines corresponding to the limit between two successive difficulty levels.

It will be seen below, with reference to FIG. 7, how this lookup table 30 is constructed.

The unit 2 obtains, in steps 105 and 106, respectively, parameters specific to the machine 1 used and to the material from which the lens 10 is made.

The unit 2 then determines, in step 107, the following polishing parameters from the difficulty level A-C, the generator of the machine 1, and the material of the lens 10:

the rotation speed Vrot of the lens;
the scan speed Vbalay;
the number Nbalay of scans; and
the scan amplitude Abalay.

These cumulative parameters are representative of the polishing time, which is critical to productivity.

Therefore, the unit 2 obtains, in this step 107, simply and rapidly, the above polishing parameters Vrot, Vbalay, Nbalay and Abalay, these parameters being required if a progressive lens 10 is to be obtained by polishing of the surface 12.

Thus, the polishing process may continue and the machine 1 may produce said surface 12 with great precision.

FIG. 4 shows how the unit 2 chooses to process only a useful portion of the surface 12, which useful portion is known to contain the largest geometric altitude gradient. The expression "useful portion of the surface 12" is understood to mean a zone, centered on the preset reference point on the surface, for example having a diameter smaller than or equal to 50 mm, where it is important for the surfacing to be good because geometric features essential to the desired surface are contained therein. This is because the edges of the lens 10, where the largest altitude gradients are generally found, are not considered to be representative of how difficult the surfacing will be.

This portion of the surface 12 contains two concentric circles 20 and 21 centered on a prism reference point PRP on the surface 12, corresponding to the center of rotation of the spectacle lens 10 with respect to a polishing coordinate system of the machine 1. Here, this coordinate system represents the axis of rotation of the spindle that bears the lens. This coordinate system does not always correspond to the geometric center of the lens 10.

These two concentric circles 20 and 21 are located between the periphery and the center of rotation of the spectacle lens 10.

The useful portion of the surface 12 of the lens has an external outline that follows what is called a frame outline (not shown) of the lens 10, which frame outline corresponds to the outline of the lens 10 obtained after a trimming operation for shaping the lens 10 to the frame of the spectacles. Here, the spectacle frame is circular and therefore the frame outline of the lens 10 is also circular.

Points 24 and 25 on which the unit 2 will work are shown on these circles 20 and 21.

For example, the circle 20 has a diameter of 32 mm and 120 points are arranged on this circle 20 in order to obtain a sampling pitch of 3°.

As for the circle 21, it has a diameter of 36 mm, and 120 points are also arranged on this circle 21 in order to obtain the same sampling pitch.

In practice, as will be seen below in greater detail, it is a question of calculating altitude differences for a series of pairs each comprising two points 24 or 25 that are diametrically opposite on the circle 20 or 21 on the surface 12, the diagonal of course passing through the PRP; hence, sampling of pairs of points in fact takes place only every 3° over 180°, which is enough to cover all of the circle 20 or 21.

The points of a pair of points are equidistant from the PRP.

Figure 5:
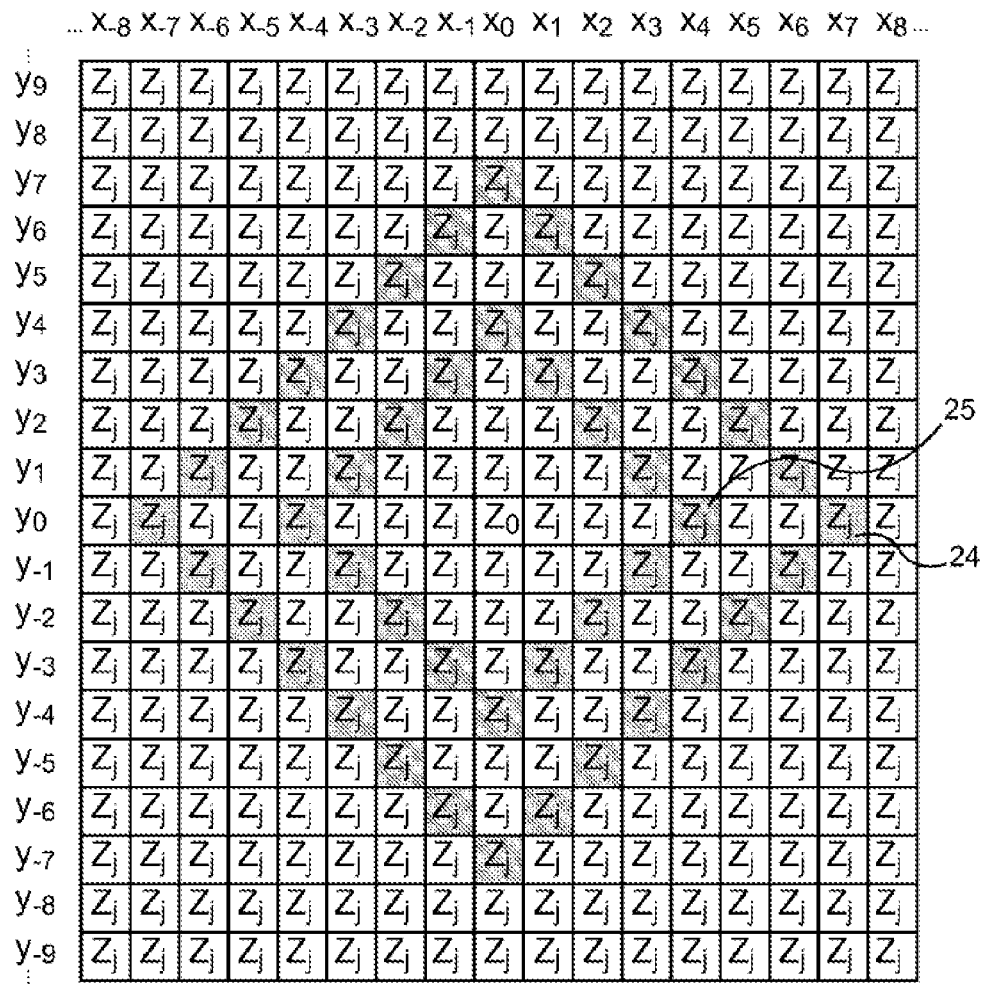

In FIGS. 4 and 5, only a certain number of these 240 points have been shown for the sake of legibility.

Points 24 and 25 represent altitude geometric values Zj that are partially illustrated in FIG. 5 in the form of a matrix file.

The center of the file corresponds to the intersection between the axis of the spindle bearing the lens 10 and the surface 12 of the lens 10, the axis passing through the point PRP.

This file center is used as a reference for the sampling and the calculations that allow the rotation speed of the lens to be determined i.e. x=0, y=0 and z=0 (denoted $x_0$, $y_0$ and $z_0$, respectively).

Figure 6:
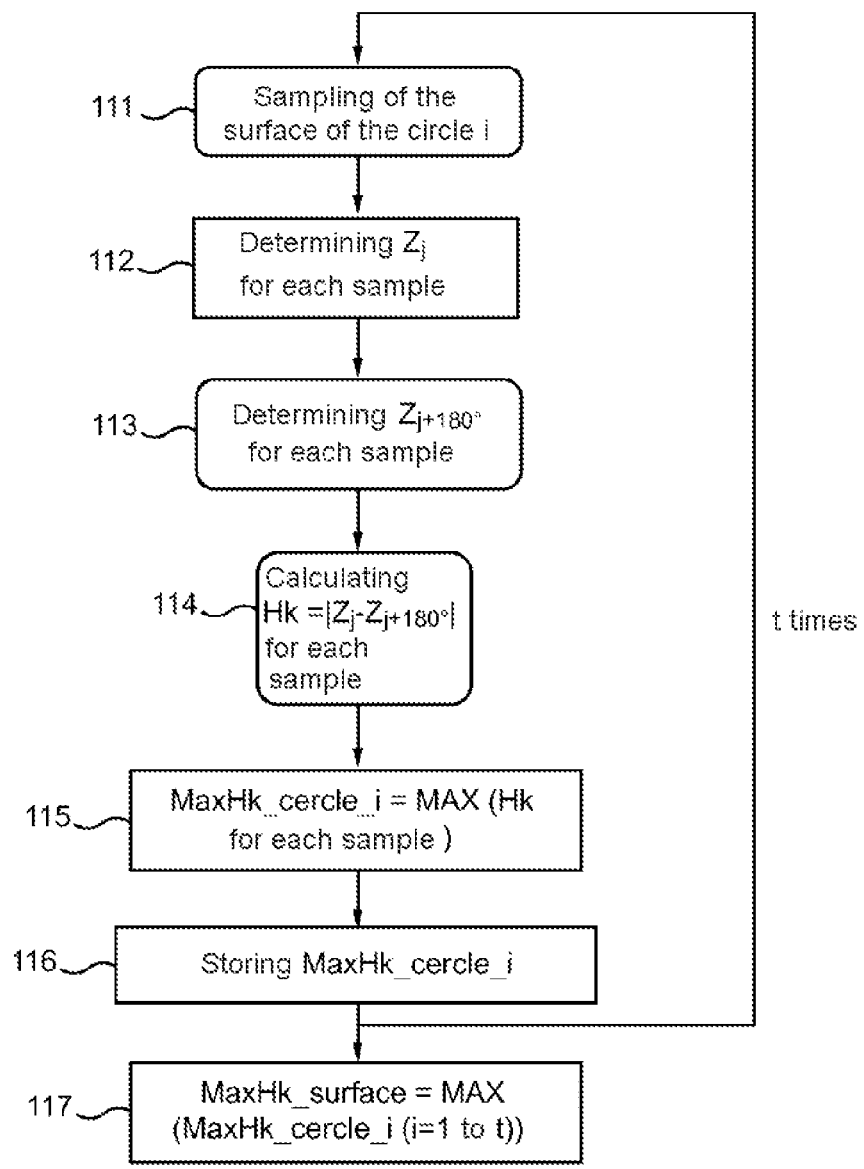
FIGS. 6 and 7 are block diagrams showing the step of determining the value representing the largest difference between altitude geometric values on the surface, and steps for constructing the lookup table, respectively.

FIG. 6 is a block diagram of steps allowing the value MaxHk on the surface 12 to be determined for a number t of circles on the surface 12. Here, t=2.

In order to determine the value MaxHk on the surface 12, the unit 2 measures differences between altitude geometric values on each of the circles 20 and 21.

To do this, the unit 2 characterizes, in step 111, as seen above, using a first circle 20, the surface 12, so as to obtain a series of points 24.

Each of the points 24, which are distributed over 180° with a pitch of 3°, is characterized by its altitude Zj (also called the first altitude geometric value) with respect to the center PRP, which altitude geometric value Zj is determined for each point, in step 112.

The unit 2 seeks, on the circle 20, in step 113, all the points 24 diametrically opposite the points 24 the altitude geometric value Zj of which was determined in step 112, i.e. which are spaced apart pairwise by an angle of 180°; and determines in the same step 113 the altitude geometric value Zj+180° (also called the second altitude geometric value) of all these points 24 that are diametrically opposite.

The diametrically opposite points 24 form pairs of points characterized by the respective altitude geometric values Zj and Zj+180°.

Next, the unit 2 compares, in step 114, the altitude geometric values Zj and Zj+180° for each pair of points 24, and therefore determines, in the same step, based on this comparison, the value of the difference Hk between the altitude geometric values of the points 24 on the circle 20.

Next, in step 115, the unit 2 compares all the values Hk for the circle 20 and determines the largest value MaxHk_cercle_1 of said values Hk.

This value MaxHk_cercle_1, representing the largest difference between altitude geometric values on the circle 20 (called circle No. 1), is stored in memory in step 116, for example in the memory 5 of the data processing system of the unit 2.

Next, the same steps 111 to 116 are executed for the circle 21 (called circle No. 2) so as to obtain a value MaxHk_cercle_2 representing the largest difference between altitude geometric values on the circle 21.

Of course, these steps are repeated t times.

Lastly, in step 117, the unit 2 compares the values MaxHk_cercle_1 and MaxHk_cercle_2 and determines the largest value MaxHk_surface on the surface 12, which value MaxHk_surface represents the largest difference between altitude geometric values on the (useful) surface 12 of the lens 10 to be polished.

Figure 7:
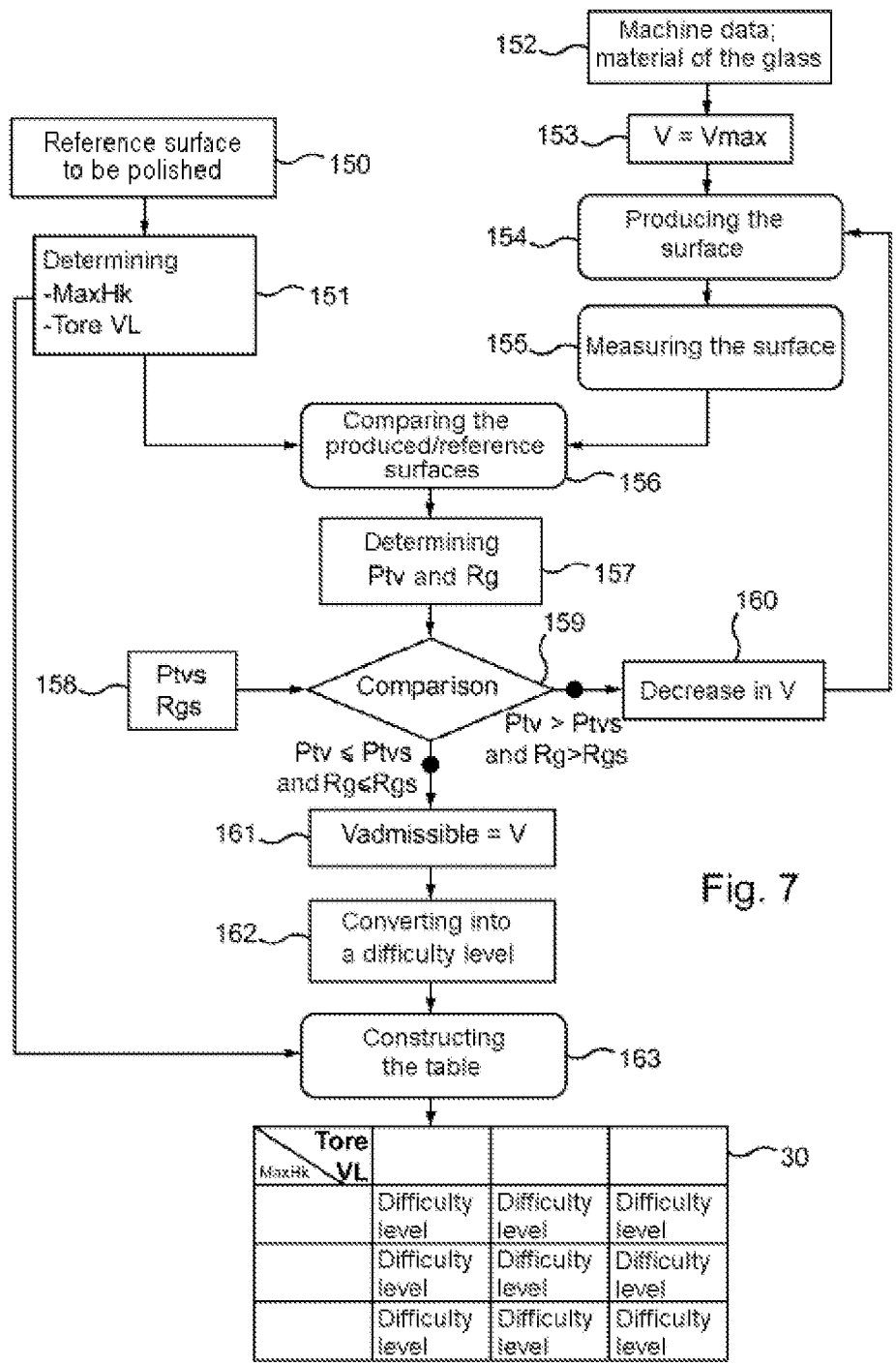

In FIG. 6, this value MaxHk_surface corresponds to the value MaxHk in FIGS. 3 and 7.

FIG. 7 is a block diagram of steps allowing the difficulty level lookup table stored in the memory 4 of the data-processing system of the unit 2 to be constructed.

This lookup table may be constructed by the unit 2 directly, or be constructed beforehand by another data-processing system and loaded into the memory 4 of the system of the unit 2.

To construct the difficulty level lookup table 30, a reference surface to be polished is chosen in a step 150, and a file of x, y, z coordinates in a Cartesian coordinate system is obtained therefrom, from which file a centered file, taking into account the prism value, is generated, as in steps 100 to 102 above.

Furthermore, this reference surface has a preset surface state, i.e. a preset roughness.

The coordinates of the surface 12 allow, in step 151, as seen above in step 103 of the process, geometric values of the largest altitude gradient MaxHk and of cylinder FV Torus at the far-vision control point to be determined for the surface.

In a step 152, parameters specific to a polishing machine, and data on the material used for the spectacle lens 10, are obtained.

Next, in step 153, the initial rotation speed used to polish the surface of the lens is set to the maximum speed in the speed range of the machine, which range is chosen depending on the material of the lens.

In step 154, the machine polishes the chosen reference surface.

Next, the surface polished in step 155 is measured, thereby obtaining coordinates at any point on this surface, and its roughness.

Next, in step 156, the coordinates of the chosen reference surface and the coordinates of the surface thus produced, and the roughness obtained and the roughness sought, are compared, based on which comparisons a surface, called the residual surface, is deduced.

This residual surface is generated by form errors of the polishing machine 1 when it polishes the surface 12 of the progressive spectacle lens 10.

Thus, in step 157, a value of a peak-to-valley deviation Ptv representing altitude variations in the residual surface, and a deviation value Rg representing the roughness deviation of this residual surface, are determined.

Next, in a step 159, the values of the determined deviations Ptv and Rg are compared with respective deviation threshold values Ptvs and Rgs obtained in a step 158.

If the comparisons result in values Ptv and Rg higher than the respective values Ptvs and Rgs, this means that the chosen speed does not form part of the admissible speed range and that it is therefore necessary to decrease the rotation speed of the lens in a step 160. If required, it will be necessary to polish a new surface 12 of a lens 10, to measure and then compare this new surface 12 (steps 154 to 159).

If the comparisons result in values Ptv and Rg lower than or equal to the respective values Ptvs and Rgs, this means that the chosen speed forms part of the admissible speed range and the maximum admissible rotation speed of the lens is deduced therefrom in a step 161.

Next, in step 162, the deduced maximum speed is converted into a difficulty level ranging from A to C.

The value Ptvs corresponds to the threshold of passage from one difficulty level to another.

In other words, this value Ptvs corresponds to the straight lines of equal and negative slope, iso Ptv, seen above in FIG. 2.

It is thus possible to construct and complete the lookup table 30, in a step 163, by attributing a difficulty level to the pair formed by the value MaxHk (determined with the prism value taken into account) and the value Tore VL, until a complete lookup table 30 is obtained.

Figure 8:
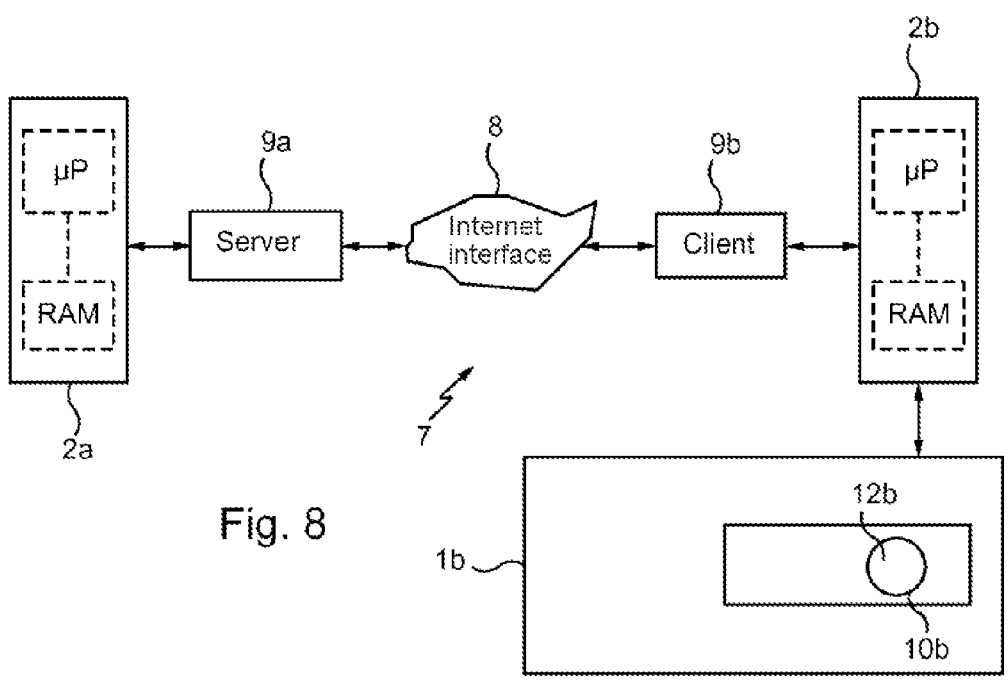
FIG. 8 schematically shows a client-server communication interface comprising means adapted to transfer the rotation speed determined by the process to a remote control-command unit.

FIG. 8 illustrates a client-server communication interface 7 comprising what is called a provider side 9a and another side called the client side 9b, these two sides communicating via an Internet interface 8.

The provider side comprises a server 9a connected to a command-control unit 2a of the same type as that in FIG. 1, though this time this command-control unit 2a is not integrated into a polishing machine, the server 9a being configured to communicate with the Internet interface 8.

The client side 9b is configured to communicate with the Internet interface 8, and is connected to a control-command unit 2b of the same type as that on the provider side.

Furthermore, the client-side unit 2b is connected to a polishing machine 1b of the same type as that in FIG. 1, in order to allow a surface 12b of a progressive spectacle lens 10b to be polished.

The unit 2b is configured to receive, client-side, a file of coordinates characterizing the geometry of the surface 12b to be produced, data characterizing parameters specific to the polishing machine 1b used, and data characterizing the material of the lens 10b used.

To allow the rotation speed, the scan speed and the number of scans to be determined, this unit 2b transmits these data, via the Internet interface 8 and the server 9a, to the provider-side unit 2a.

This unit 2a executes, via its data-processing system, the computer program that it contains, in order to implement the polishing process and thus deduce the polishing parameters i.e. the rotation speed, the scan speed, the number of scans and the scan amplitude, to be used to polish the surface 12b of the lens 10b.

The unit 2a transmits these determined polishing parameters, via the server 9a and the Internet interface 8, to the client-side command-control unit 2b.

This unit 2b is configured to execute, using the received parameters, a software package for implementing a process for polishing the lens 10b, in order to produce the complex optical surface 12b on the lens 10b.

In other variants (not illustrated):

- the process is not a polishing process but instead a turning machining process, in particular rough turning or finishing, and, if required, the parameters to be determined in addition to the rotation speed are not the scan speed, the number of scans and the scan amplitude, but instead the speed of advance and the depth of cut;
- the number of circles allowing the surface 12 of the lens 10 to be sampled is different from t=2, but the value of t may be much higher, for example t=45, with the circle of minimum diameter having a diameter of 1 mm, the circle of maximum diameter having a diameter of 90 mm, and the pitch between each circle being 2 mm;
- the useful surface portion of the lens has an external outline that follows a frame outline of said lens, which frame outline corresponds to the outline of said lens obtained after a trimming operation, and this frame outline is not a circular in shape, but is, for example, rectangular or oval in shape or indeed another shape;
- the difficulty level table does not contain 3 difficulty levels, this table instead containing another number of difficulty levels, for example 2 to 10; this for example depends on the precision of the surface file and therefore of the generated centered file and/or on the type of surfacing process because rough turning generally requires more difficulty levels than polishing;
- the surface 12 is not sampled directly using points on the latter but instead successions of mutually tangential circular dots that, for example, have a diameter of about 2 mm to 8 mm, in order, for example, to provide a sampling pitch of about 5° to 20°, and that correspond to a cloud of individual points having coordinates, from which, especially using well-known methods based, for example, on Zernike polynomials, mean altitude geometric values are deduced, are used;
- the command-control unit does not comprise a microprocessor but a microcontroller instead;
- the surfacing machine may not work with a lens turning at the determined maximum threshold speed, the speed instead possibly varying during the cycle, i.e. the machine may work certain zones of the lens while rotating the latter at a lower speed;
- the cylinder value, in particular the values R1 and R2, are not obtained from x, y and z coordinates, these values instead being obtained from the prescribed cylinder power;
- the communication interface may allow communication via a network other than the Internet, for example an intranet or a secure private network; and/or
- the communication interface 8 may also allow, for implementation of the process in the polishing machine 1b, all of the computer program to be transferred to the remote data-processing system 2b.

It will be recalled, more generally, that the invention is not limited to the examples described and illustrated.

The invention claimed is:

1. A process for surfacing a surface (12) of a spectacle lens (10), comprising a step of determining a fixed rotation speed (Vrot) of said spectacle lens (10) from geometric characteristics of said surface (12), characterized in that the step of determining the rotation speed (Vrot) comprises the following steps:
    generating (102), from geometric characteristics of said surface (12), a file of altitude geometric values (Zj) of said surface (12), which file is centered on an altitude geometric value ($Z_o$) at a preset reference point (PRP);
    determining (103) a value representing the largest difference (MaxHk) between altitude geometric values (Zj) on said surface (12);
    deducing (107) the rotation speed (Vrot) from said value of the largest difference (MaxHk) between altitude geometric values (Zj) on said surface (12), and from a cylinder geometric value (FV Torus) at a predetermined far-vision control point; and
    surfacing the surface (12) of the spectacle lens (10), using a polishing tool based on the deduced rotation speed.

2. The process as claimed in claim 1, characterized in that the step (103) of determining the value representing the largest difference (MaxHk) between altitude geometric values (Zj) comprises a step of processing (111-117) the altitude geometric values (Zj) of said surface (12) in said centered file by taking into account pairs of individual points (24, 25) on said surface (12), which individual points (24, 25) of each pair are diagonally opposite on said surface (12), the diagonal passing through said preset reference point (PRP), said individual points (24, 25) being equidistant from said preset reference point (PRP).

3. The process as claimed in claim 1, characterized in that the step (103) of determining the value representing the largest difference (MaxHK) between altitude geometric values (Zj) comprises a step of processing the altitude geometric values (Zj) of said surface (12) in said centered file, only a useful portion of the surface (12) of the lens (10) being taken into account, it being known that said useful portion contains the largest altitude gradient.

4. The process as claimed in claim 3, characterized in that said useful portion of the surface (12) is located in an intermediate annular zone between the periphery and center of the surface (12).

5. The process as claimed in claim 3, characterized in that said useful portion of the surface (12) has an external outline that follows a frame outline of said lens (10), which frame outline corresponds to the outline of said lens (10) obtained after a trimming operation.

6. The process as claimed in claim 1, characterized in that said preset reference point is representative of the prism reference point (PRP).

7. The process as claimed in claim 1, characterized in that the step (103) of determining the value of the largest difference (MaxHK) between altitude geometric values (Zj) on said surface (12) comprises the following steps:
    determining (112) first altitude geometric values (Zj) on said surface (12);
    determining (113) second altitude geometric values (Zj+180°) having a preset angular offset with respect to said first altitude geometric values (Zj);
    comparing (114-116) said first altitude geometric values (Zj) with said angularly offset second altitude geometric values (Zj+180°); and
    determining (117) the value of the largest difference (MaxHk) between altitude geometric values (Zj) on said surface (12).

8. The process as claimed in claim 1, characterized in that it is a process for polishing said surface (12) of said spectacle lens (10).

9. The process as claimed in claim 8, characterized in that it comprises at least one of the following additional steps:
    deducing (107) a scan speed (Vbalay) of the polishing machine (1) from said value of the largest difference (MaxHk) between altitude geometric values (Zj) on said surface (12), from said cylinder geometric value (FV Torus) and from the material of said spectacle lens (10);

deducing (107) a number (Nbalay) of scans of the scanning tool of the polishing machine (1) from said value of the largest difference (MaxHk) between altitude geometric values (Zj) on said surface (12), from said cylinder geometric value (FV Torus) and from the material of said spectacle lens (10); and deducing (107) a scanning amplitude (Abalay) for the scanning tool of the polishing machine (1) from said value of the largest difference (MaxHk) between altitude geometric values (Zj) on said surface (12), from said cylinder geometric value (FV Torus) and from the material of said spectacle lens (10).

10. The process as claimed in claim 1, characterized in that the step of determining the rotation speed (Vrot) of the lens comprises the following steps:

deducing (104) a level of intrinsic difficulty (A-C) at said surface (12) from the value of the largest difference (MaxHk) between altitude geometric values (Zj) and from the cylinder geometric value (FV Torus); and selecting (107) the rotation speed of the lens (Vrot) based on said level of intrinsic difficulty (A-C) and on parameters specific to the surfacing machine used.

11. The process as claimed in claim 10, characterized in that said level of intrinsic difficulty (A-C) at the surface (12) is chosen from a plurality of levels of intrinsic difficulty (A-C) preset as a function of preset ranges of cylinder geometric values (FV Torus) and of preset ranges of values of the largest difference (MaxHk) between altitude geometric values (Zj).

12. A control-command unit provided with a microprocessor (3) configured to execute a computer program for implementing the process as claimed in claim 1.

13. A surfacing machine for producing a surface (12) of a spectacle lens (10) comprising a control-command unit as claimed in claim 12.

14. A client-server communication interface comprising means (9a, 9b) configured to transfer the rotation speed of the lens, which speed is determined by a computer program, in order to implement the process as claimed in claim 1, when this computer program is executed in a control-command unit (2).

15. The process as claimed in claim 2, characterized in that the step (103) of determining the value representing the largest difference (MaxHK) between altitude geometric values (Zj) comprises a step of processing the altitude geometric values (Zj) of said surface (12) in said centered file, only a useful portion of the surface (12) of the lens (10) being taken into account, it being known that said useful portion contains the largest altitude gradient.

16. The process as claimed in claim 4, characterized in that said useful portion of the surface (12) has an external outline that follows a frame outline of said lens (10), which frame outline corresponds to the outline of said lens (10) obtained after a trimming operation.

* * * * *